Aug. 12, 1924.

C. H. SHEDENHELM
LOADING DEVICE
Filed Sept. 29, 1922

Inventor
Charles Shedenhelm
By William C. Linton
Attorney

Aug. 12, 1924.

C. H. SHEDENHELM
LOADING DEVICE
Filed Sept. 22, 1922

Inventor
Charles Shedenhelm.

By William C. Linton
Attorney

Patented Aug. 12, 1924.

1,504,984

UNITED STATES PATENT OFFICE.

CHARLES H. SHEDENHELM, OF FREMONT, OHIO.

LOADING DEVICE.

Application filed September 29, 1922. Serial No. 591,377.

*To all whom it may concern:*

Be it known that I, CHARLES H. SHEDENHELM, a citizen of the United States of America, residing at Fremont, in the county of Sandusky, State of Ohio, have invented certain new and useful Improvements in Loading Devices; and I do hereby declare that the following is a full, clear, concise, and exact description of the invention, such as will enable others skilled in the art to which it appertains to make and use the same.

This invention relates to improvements in hay loading devices for wagons, having for an object to provide a manually operable hay loading device especially adapted for installation upon wagons, such as those of a hay rack type, whereby hay may be moved from the surface of a field onto a wagon so equipped as to avoid the necessity of pitching the same by hand with the use of forks thereinto, or with the use of grapples or similar hoisting and conveying, thus permitting loading of the wagon to be more quickly effected and likewise, dispensing with considerable labor and incident expense.

Another and equally important object of the invention is to provide the device with a novel loading platform mounted upon carriages adapted to be propelled over tracks upon the wagon floor and equipped with means for preventing their lateral displacement during a loading or unloading operation.

Other objects will be in part obvious and in part pointed out hereinafter.

In order that the invention and its mode of operation may be readily understood by persons skilled in the art, I have in the accompanying illustrative drawings, and in the detailed following description based thereon, set out one possible embodiment of the same.

Having more particular reference to the drawings, in connection with which like characters of reference will designate corresponding parts throughout, 1 represents, in its entirety, a wagon of the hay rack type, which is equipped with the invention, the flooring of such wagon being provided with parallel longitudinally disposed tracks 2 extending from one end of said floor to the other and being arranged in proximity to the opposite marginal portions thereof.

Figure 2:
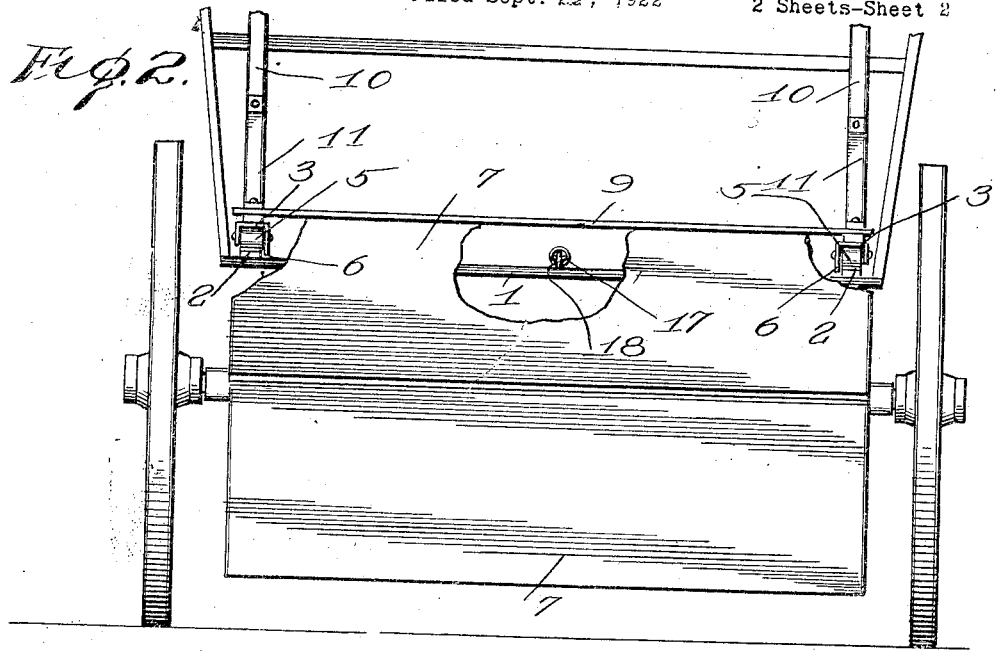
Figure 2 is a fragmental end elevation of the wagon equipped with the invention having a portion of one of the loading truck sections broken away.
Figure 3:
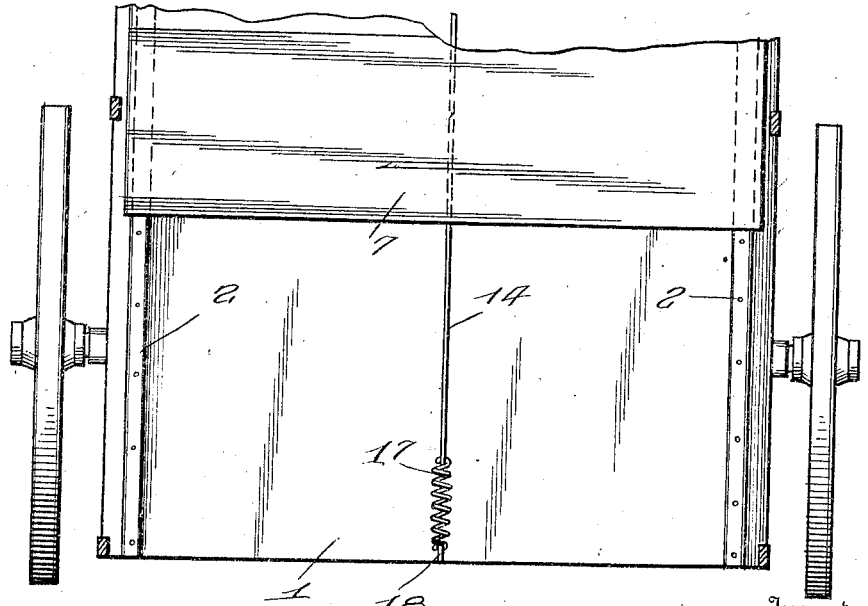
Figure 3 is a fragmentary horizontal section through the rear end or portion of the wagon showing the arrangement of the tracks thereon and the connection of one end of the propelling cable to the wagon floor; and, Figure 4 is a fragmentary detail in perspective of one of the carriages employed in connection with the loading truck sections.

With a view towards providing means for permitting the loading or unloading of matter onto the wagon 1 from the surface of a field or the like, there is provided a truck consisting of a plurality of inter-connected carriages generally indicated by the numeral 3, said carriages being cast of single pieces of metal substantially U-shaped, as shown in the Figures 2 and 4, and having forwardly and rearwardly disposed bearing extensions 4 formed thereon, adapted to receive rollers 5 between the same. Lips 6 are formed upon the inner sides of each of said carriages 3 and as shown in the Figures 2 and 4, are adapted to extend or slightly overlap the adjacent side of the particular track 2 receiving the same. These carriages 3 are arranged in oppositely disposed pairs adapted to be inter-connected by means of platforms, such as indicated by the numeral 7 and when so inter-connected and arranged upon their respective tracks 2, it will be understood that lateral displacement thereof during a loading or unloading operation will be prevented by reason of the engagement of the extended lips 6 with the inner sides of the adjacent tracks 2.

As above stated, the carriages 3 are adapted to be arranged in oppositely disposed pairs and two or more of these pairs may be inter-connected by the sectional platforms 7. Furthermore, the adjacent ends of the carriages 3 are preferably pivotally inter-connected as indicated by the numeral 8, thus permitting the sectional platforms to have relative swinging movement as indicated in the Figure 1, in order that when they are moved onto or from the flooring 1, they will be permitted to automatically adjust themselves.

The remaining carriages 3 are inter-connected by means of a larger platform 9 arranged over and connected to the various body portions of the same by suitable fastening devices, not shown. This platform 9 affords an effectual stand for an operator of the wagon during the loading or unloading operation.

Standards 10 are rigidly mounted upon the forward portion of the platform 9 and are braced by diagonally disposed arms 11 against vibratory or other undue movement. Mounted in the upper ends of these standards 10 in suitable bearings provided therefor is a drum or windlass 12 provided with a crank handle 13. This windlass 12 affords means for causing the loading or unloading truck consisting of the platforms 7 and 9 and their respective wheeled carriages 3 to be moved, selectively, in opposite directions over the track 2 upon the floor of the wagon 1, receiving thereabout a cable 14. The cable 14 is secured at one end to the forward of the wagon body, as indicated at 15, while the intermediate portion thereof is passed over a guide pulley 16 rotatably mounted in a bearing bracket carried upon the intermediate forward marginal portion of the platform 9, from whence it is passed upwardly and coiled several times about the roller 12, whereupon the same is then extended downwardly over another guide pulley 16 rearwardly and longitudinally of the wagon floor into engagement with a contractile coiled spring 17. The coiled spring 17, in turn, is fixedly connected at its remaining end to the rearward end of the wagon floor, as indicated at 18, thus providing an effectual means for removing slack, at any time, from the cable 14 and the loading or unloading truck to immediately respond to any movement of the windlass 12, about which the intermediate portion of said cable is coiled.

Figure 1:
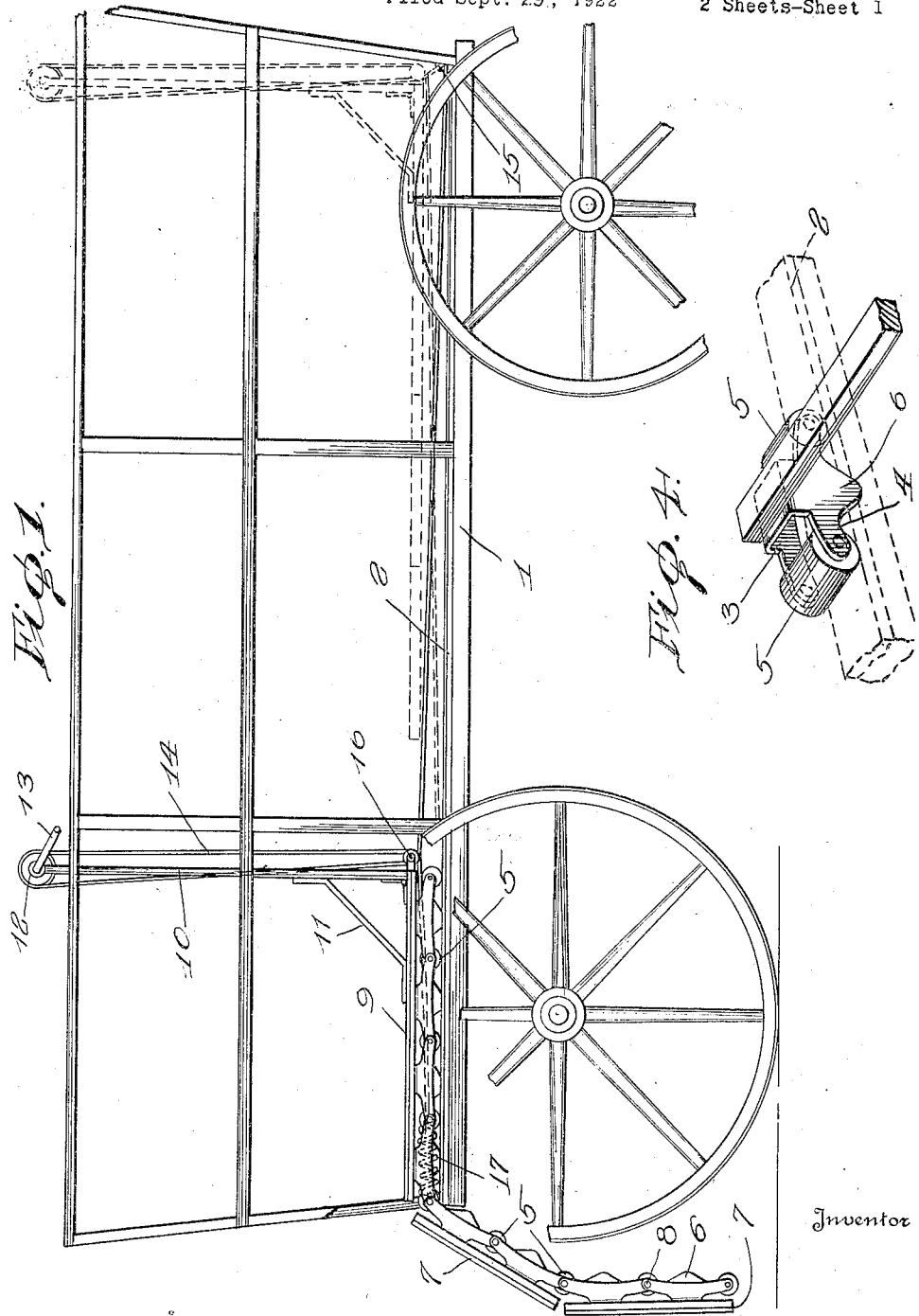
Figure 1 is a side elevation of a wagon equipped with the improved hay loading device having a part thereof broken away to illustrate the arrangement of the platform on the floor of the same.

In operation of my improved loading and unloading device, the main platform 9 is arranged in the position as indicated in the Figure 1, whereat the sectional platforms 7 will be arranged upon or in proximity to the surface of a field over which the wagon 1 is to be moved. At this time, the hay or other matter to be loaded on the wagon body is arranged adjacent the innermost section and connected thereto by a sling or other suitable device. With the hay so arranged on the truck, the operator standing on the platform 9 rotates the windlass 12 in a direction to cause inward movement of the loading truck over the tracks 2, thus moving the matter so attached to the inner sectional platform into the wagon body. At this time, another quantity of hay or matter is attached to the following sectional platform which is likewise moved into the wagon body by rotation of the windlass 12 through the medium of the crank handle 13. In this connection, it of course will be understood that with rotation of the windlass 12 in the proper direction, the cable 14 coiled thereabout will be caused to move over the same and in consequence, permit the pulling of the loading truck into the wagon body. The manner of attaching and receiving the quantities of hay or other matter into the wagon body is repeated until the wagon has been completely filled. To unload the wagon, it is only necessary that the operator rotate the windlass 12 in an opposite direction, causing the cable 14 to be passed thereover in a corresponding direction and in consequence, effect the pulling of the truck to the rearward end of the wagon floor, whereupon the sectional platform 7 will drop over the end thereof in the manner shown in the Figure 1, thus permitting the wagon contents to be quickly and effectually unloaded or discharged.

From the foregoing, it will be understood that I have provided a simple but practical form of loading or unloading device for wagons. While the device is especially described as being adapted for use in connection with the hay rack type of wagon, it will be clearly understood that the same may be successfully employed in connection with other forms of wagons, such as conditions or preference may dictate. Furthermore, due to the peculiar formation of the carriages 3 with their downwardly extending lip portions 6, liability of lateral displacement of the trucks during a loading or unloading operation will be materially prevented. Also, because of the yieldable connection of the cable 14 with the rearward end of the wagon floor through the medium of the contractile coiled spring 17, it will be appreciated that said cable will at all times be maintained taut and in consequence, that the truck will immediately respond to any movement of the windlass 12 which causes the cable 14 to pass thereover.

Manifestly, the construction shown is capable of considerable modification and such modification as is within the scope of my claim, I consider within the spirit of my invention.

I claim:—

In combination with a wagon, pivotally inter-connected carriages consisting of substantially U-shaped body portions having downwardly disposed lips formed upon their inner sides and forwardly and rearwardly disposed bearing arms, rollers rotatably mounted between said forwardly and rearwardly disposed bearing arms, tracks disposed longitudinally of the wagon floor in parallel relation for receiving said carriages, the downwardly disposed lips of the body portions of said carriages engaging the inner sides of said tracks, platforms arranged upon the upper portions of the body portions of said carriages and inter-connecting certain of the same, standards fixedly mounted upon one of said platforms, a windlass rotatably mounted in the upper ends of said standards, a cable disposed longitudinally of the wagon floor having the forward end thereof connected to the forward end of the wagon floor, a contractile spring connected to the remaining end of said cable and to the rearward end of the wagon floor, the intermediate portion of said cable passing upwardly and being coiled about said windlass, as and for the purpose set forth.

In witness whereof I have hereunto set my hand.

CHARLES H. SHEDENHELM.